(12) United States Patent
    Chang et al.

(10) Patent No.: US 12,614,576 B2
(45) Date of Patent: *Apr. 28, 2026

---

(54) PUF APPLICATIONS IN MEMORIES

(71) Applicant: MACRONIX INTERNATIONAL CO., LTD., Hsinchu (TW)

(72) Inventors: Chin-Hung Chang, Tainan (TW); Chia-Jung Chen, Hsinchu (TW); Ken-Hui Chen, Hsinchu (TW); Kuen-Long Chang, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/888,661

(22) Filed: Sep. 18, 2024

(65) Prior Publication Data

US 2025/0014617 A1     Jan. 9, 2025

Related U.S. Application Data

(63) Continuation of application No. 18/231,611, filed on Aug. 8, 2023, now Pat. No. 12,136,471, which is a continuation of application No. 17/834,287, filed on Jun. 7, 2022, now Pat. No. 11,763,867, which is a continuation of application No. 17/087,085, filed on Nov. 2, 2020, now Pat. No. 11,380,379.

(51) Int. Cl.
    *G06F 21/44*     (2013.01)
    *G11C 7/24*      (2006.01)
    *H04L 9/08*      (2006.01)
    *H04L 9/32*      (2006.01)

(52) U.S. Cl.
    CPC ............... *G11C 7/24* (2013.01); *G06F 21/44* (2013.01); *H04L 9/3278* (2013.01)

(58) Field of Classification Search
    CPC .......... G11C 7/24; G06F 21/44; H04L 9/3278
    See application file for complete search history.

(56) References Cited

U.S. PATENT DOCUMENTS 3,694,856 A     10/1972   Kaufman et al.
5,442,704 A      8/1995   Holtey
                (Continued)

FOREIGN PATENT DOCUMENTS

CN     104836669 A     8/2015
CN     105007285 A    10/2015
                (Continued)

OTHER PUBLICATIONS

"Operational Amplifier," Wikipedia definition, downloaded Jan. 30, 2019, 23 pages.

(Continued)

*Primary Examiner* — Darshan I Dhruv
(74) *Attorney, Agent, or Firm* — Paul Durdik; Haynes Beffel & Wolfeld LLP

(57)     ABSTRACT

A memory device comprises an array of memory cells, a physically unclonable function PUF circuit in the memory device to generate a PUF code, a data path connecting a first circuit to a second circuit in the memory device coupled to the array of memory cells, and logic circuitry to encode data on the data path from the first circuit using the PUF code to produce encoded data, and to provide the encoded data to the second circuit.

21 Claims, 13 Drawing Sheets

(56) References Cited

U.S. PATENT DOCUMENTS

| | | | |
|---|---|---|---|
| 6,947,556 B1 | 9/2005 | Matyas, Jr. et al. | |
| 7,356,659 B2 | 4/2008 | Kobayashi et al. | |
| 8,145,855 B2 | 3/2012 | Wan et al. | |
| 8,290,150 B2 | 10/2012 | Erhart et al. | |
| 8,391,070 B2 | 3/2013 | Bathul et al. | |
| 8,448,256 B2 | 5/2013 | Borchert et al. | |
| 8,694,856 B2 | 4/2014 | Tuyls et al. | |
| 8,711,626 B2 | 4/2014 | Lee | |
| 8,819,409 B2 | 8/2014 | Kuipers et al. | |
| 8,933,516 B1 | 1/2015 | Wu et al. | |
| 8,971,527 B2 | 3/2015 | BrightSky et al. | |
| 8,995,169 B1 | 3/2015 | Bandyopadhyay et al. | |
| 9,001,554 B2 | 4/2015 | Hashim et al. | |
| 9,071,446 B2 | 6/2015 | Kreft | |
| 9,082,514 B1 | 7/2015 | Trimberger | |
| 9,093,128 B2 | 7/2015 | Otterstedt et al. | |
| 9,158,906 B2 | 10/2015 | Guajardo Merchan et al. | |
| 9,171,144 B2 | 10/2015 | Lewis et al. | |
| 9,218,477 B2 | 12/2015 | Lewis et al. | |
| 9,245,925 B1 | 1/2016 | Lee et al. | |
| 9,298,946 B2 | 3/2016 | Zhu et al. | |
| 9,324,436 B2 | 4/2016 | Kim et al. | |
| 9,343,135 B2 | 5/2016 | Zhu et al. | |
| 9,368,207 B2 | 6/2016 | Bandyopadhyay et al. | |
| 9,391,772 B2 | 7/2016 | Suzuki | |
| 9,396,357 B2 | 7/2016 | Van Der Leest et al. | |
| 9,407,437 B1 | 8/2016 | Campagna | |
| 9,448,874 B2 | 9/2016 | Kim et al. | |
| 9,455,022 B2 | 9/2016 | Yabuuchi et al. | |
| 9,455,403 B1 | 9/2016 | Lai et al. | |
| 9,461,826 B2 | 10/2016 | Kreft | |
| 9,485,094 B1 | 11/2016 | Parvarandeh et al. | |
| 9,536,581 B2 | 1/2017 | Katoh et al. | |
| 9,548,113 B2 | 1/2017 | Yoshimoto et al. | |
| 9,558,358 B2 | 1/2017 | Aissi et al. | |
| 9,588,908 B2 | 3/2017 | Cambou | |
| 9,646,178 B2 | 5/2017 | Kan | |
| 9,653,161 B2 | 5/2017 | Yoshimoto et al. | |
| 9,686,248 B2 | 6/2017 | Dover | |
| 9,787,480 B2 | 10/2017 | Guo et al. | |
| 9,811,689 B1 | 11/2017 | Tseng et al. | |
| 9,870,829 B2 | 1/2018 | Park et al. | |
| 9,966,467 B2 | 5/2018 | Watanabe | |
| 9,985,791 B2 | 5/2018 | Cambou | |
| 10,097,348 B2 | 10/2018 | Kara-Ivanov et al. | |
| 10,311,930 B1 | 6/2019 | Kim et al. | |
| 10,404,478 B2 | 9/2019 | Hung et al. | |
| 10,469,271 B2 | 11/2019 | Hung et al. | |
| 10,649,735 B2 | 5/2020 | Chen et al. | |
| 10,680,809 B2 | 6/2020 | Chang et al. | |
| 10,715,340 B2 | 7/2020 | Hung et al. | |
| 10,749,695 B2 | 8/2020 | Hung et al. | |
| 10,855,477 B2 | 12/2020 | Hung et al. | |
| 10,911,229 B2 | 2/2021 | Hung et al. | |
| 11,380,379 B2 | 7/2022 | Chang et al. | |
| 11,601,269 B2 | 3/2023 | Hung et al. | |
| 11,763,867 B2 | 9/2023 | Chang et al. | |
| 11,895,236 B2 | 2/2024 | Hung et al. | |
| 2002/0024453 A1 | 2/2002 | Maeda | |
| 2006/0221686 A1 | 10/2006 | Devadas et al. | |
| 2007/0044139 A1 | 2/2007 | Tuyls et al. | |
| 2008/0260152 A1 | 10/2008 | Skoric et al. | |
| 2008/0279373 A1 | 11/2008 | Erhart et al. | |
| 2009/0165086 A1 | 6/2009 | Trichina et al. | |
| 2009/0249014 A1 | 10/2009 | Obereiner et al. | |
| 2012/0131340 A1 | 5/2012 | Teuwen et al. | |
| 2012/0179952 A1 | 7/2012 | Tuyls et al. | |
| 2013/0051552 A1 | 2/2013 | Handschuh et al. | |
| 2013/0138710 A1 | 5/2013 | Yamamoto et al. | |
| 2014/0091832 A1 | 4/2014 | Gotze et al. | |
| 2014/0093074 A1* | 4/2014 | Gotze | H04L 9/0866 |
| | | | 380/45 |
| 2014/0126306 A1 | 5/2014 | Otterstedt et al. | |
| 2014/0137266 A1 | 5/2014 | Chang | |
| 2014/0140513 A1 | 5/2014 | BrightSky et al. | |

| | | | |
|---|---|---|---|
| 2014/0185795 A1 | 7/2014 | Gotze et al. | |
| 2014/0189365 A1 | 7/2014 | Cox et al. | |
| 2014/0189890 A1 | 7/2014 | Koeberl et al. | |
| 2014/0225639 A1 | 8/2014 | Guo et al. | |
| 2015/0012737 A1* | 1/2015 | Newell | G06F 21/44 |
| | | | 713/2 |
| 2015/0055417 A1 | 2/2015 | Kim et al. | |
| 2015/0058928 A1 | 2/2015 | Guo et al. | |
| 2015/0070979 A1 | 3/2015 | Zhu et al. | |
| 2015/0071432 A1 | 3/2015 | Zhu et al. | |
| 2015/0074157 A1 | 3/2015 | Yu et al. | |
| 2015/0074433 A1 | 3/2015 | Zhu et al. | |
| 2015/0091747 A1 | 4/2015 | Watanabe | |
| 2015/0092939 A1 | 4/2015 | Gotze et al. | |
| 2015/0143130 A1 | 5/2015 | Ducharme et al. | |
| 2015/0154421 A1 | 6/2015 | Feng et al. | |
| 2015/0169247 A1 | 6/2015 | Wang et al. | |
| 2015/0171870 A1 | 6/2015 | Parker | |
| 2015/0234751 A1 | 8/2015 | Van Der Sluis et al. | |
| 2015/0242158 A1 | 8/2015 | Hung et al. | |
| 2015/0278551 A1 | 10/2015 | Iyer et al. | |
| 2015/0286914 A1 | 10/2015 | Kulikovska et al. | |
| 2015/0317257 A1 | 11/2015 | Seol et al. | |
| 2016/0028544 A1 | 1/2016 | Hyde et al. | |
| 2016/0093393 A1 | 3/2016 | Park et al. | |
| 2016/0103625 A1 | 4/2016 | Fujimoto et al. | |
| 2016/0148664 A1 | 5/2016 | Katoh et al. | |
| 2016/0148679 A1 | 5/2016 | Yoshimoto et al. | |
| 2016/0148680 A1 | 5/2016 | Yoshimoto et al. | |
| 2016/0156476 A1 | 6/2016 | Lee et al. | |
| 2016/0218146 A1 | 7/2016 | Lee et al. | |
| 2016/0284413 A1 | 9/2016 | Chang | |
| 2016/0301534 A1 | 10/2016 | Chen | |
| 2016/0323096 A1 | 11/2016 | Kara-Ivanov et al. | |
| 2016/0328578 A1 | 11/2016 | Plusquellic et al. | |
| 2016/0364583 A1* | 12/2016 | Benoit | H04L 9/3278 |
| 2017/0046129 A1 | 2/2017 | Cambou | |
| 2017/0048072 A1 | 2/2017 | Cambou | |
| 2017/0053708 A1 | 2/2017 | Wong et al. | |
| 2017/0126414 A1* | 5/2017 | Goel | G06F 3/0679 |
| 2017/0279606 A1* | 9/2017 | Kara-Ivanov | G09C 1/00 |
| 2017/0346644 A1 | 11/2017 | Cambou | |
| 2018/0039581 A1 | 2/2018 | Hung et al. | |
| 2018/0039784 A1 | 2/2018 | Hung et al. | |
| 2018/0040356 A1 | 2/2018 | Hung et al. | |
| 2018/0091293 A1 | 3/2018 | Suresh et al. | |
| 2018/0123808 A1 | 5/2018 | Hung et al. | |
| 2018/0176012 A1 | 6/2018 | Hung et al. | |
| 2018/0183613 A1* | 6/2018 | Dafali | H04L 9/3278 |
| 2018/0191512 A1* | 7/2018 | Tomishima | G09C 1/00 |
| 2018/0278418 A1* | 9/2018 | Chang | H04L 9/0866 |
| 2019/0081804 A1* | 3/2019 | Chen | H04L 9/0869 |
| 2019/0384938 A1 | 12/2019 | Gu et al. | |
| 2020/0186339 A1 | 6/2020 | Hung et al. | |
| 2020/0227103 A1* | 7/2020 | Shao | G11C 8/20 |
| 2020/0227121 A1* | 7/2020 | Sun | G11C 11/1673 |
| 2021/0306148 A1 | 9/2021 | Lu et al. | |

FOREIGN PATENT DOCUMENTS

| | | | | |
|---|---|---|---|---|
| CN | 103583013 B | 4/2016 | | |
| CN | 105493191 A | 4/2016 | | |
| CN | 105518786 A | 4/2016 | | |
| CN | 105518787 A | 4/2016 | | |
| CN | 105632543 A | 6/2016 | | |
| CN | 104518780 B | 12/2017 | | |
| CN | 105528560 B | 9/2018 | | |
| CN | 105474167 B | 11/2018 | | |
| EP | 2911086 A1 | 8/2015 | | |
| EP | 3641219 A1 * | 4/2020 | | H04L 9/3278 |
| TW | 200913627 A | 3/2009 | | |
| TW | 201015554 A | 4/2010 | | |
| TW | 201419029 A | 5/2014 | | |
| TW | 201500963 A | 1/2015 | | |
| TW | 201512893 A | 4/2015 | | |
| TW | 1693530 B | 5/2020 | | |
| WO | 2009002599 A2 | 12/2008 | | |
| WO | 2010035202 A1 | 4/2010 | | |
| WO | 2014076151 A1 | 5/2014 | | |

(56) References Cited

FOREIGN PATENT DOCUMENTS

| WO | 2015035033 A1 | 3/2015 |
|----|---------------|--------|
| WO | 2015105687 A1 | 7/2015 |
| WO | 2015134037 A1 | 9/2015 |

OTHER PUBLICATIONS

Federal Information Processing Standards Publication 140-2 (Supercedes FIPS Pub 140-1, Jan. 11, 1994), "Security Requirements for Cryptographic Modules,", Dec. 3, 2002, 69 pages.

Federal Information Processing Standards Publication 197, Announcing the Advanced Encryption Standard (AES), Nov. 26, 2001, 51 pages.

Fischer, "A Closer Look at Security in Random Number Generators Design," Int'l Workshop on Constructive Side-Channel Analysis and Secure Design COSADE, May 3-4, 2012, pp. 167-182.

Haahr, "Introduction to Randomness and Random Numbers," random. org, https://www.random.org/randomness/, downloaded on Jul. 26, 2017, 4 pages.

Herder et al. "Physical Unclonable Functions and Applications: A Tutorial," Proceedings of the IEEE | vol. 102, No. 8, Aug. 2014, pp. 1126-1141.

NIST Special Publication 800-38D, Dworkin, "Recommendation for Block Cipher Modes of Operation: Galois/Counter Mode (GCM) and GMAC," Nov. 2007, 39 pages.

NIST Special Publication 800-90A, Barker et al., "Recommendation for Random Number Generation Uing Deterministic Random Bit Generators," Jan. 2012, 136 pages.

Ruhrmair, et al. "PUFs at a Glance," Proceedings of the conference on Design, Automation & Test in Europe Article No. 347, Dresden, Germany—Mar. 24-28, 2014, 6 pages.

Texas Instruments Data Sheet bq26100 SHA-1/HMAC Based Security and Authentication IC with SDQ Interface, Jun. 2006, revised Aug. 205; 29 pages.

Tiri et al. "A Digital Design Flow for Secure Integration Circuits," IEEE Trans. on Computer-Aided Design of Integrated Circuits and Systems, vol. 25, No. 7, Jul. 2006, 12 pages.

Xu et al, "Reliable Physical Unclonable Functions Using Data Retention Voltage of SRAM Cells," IEEE Trans. on Computer-Aided Design of ICs and Systems, vol. 34, No. 6, Jun. 2015, 903-914.

Yoshimoto, et al., "A ReRAM-based physically unclonable function with bit error rate < 0.5% after 10 years at 125. degree. C. for40nm embedded application," 2016 IEEE Symposium on VLSI Technology, Honolulu, HI, Jun. 14-16, 2016, pp. 1-2.

Zhang et al., "TrustTokenF: a Generic Security Framework for Mobile Two-factor Authentication Using TrustZone," IEEE Trustcom/BigDataSE/ISPA, Aug. 20, 2015, pp. 41-48.

* cited by examiner

Execute a PUF circuit in a memory device to generate a PUF code, the memory device comprising a data path connecting a first circuit to a second circuit
610

Encode data on the data path from the first circuit using the PUF code to produce encoded data
620

Provide the encoded data to the second circuit
630

1100

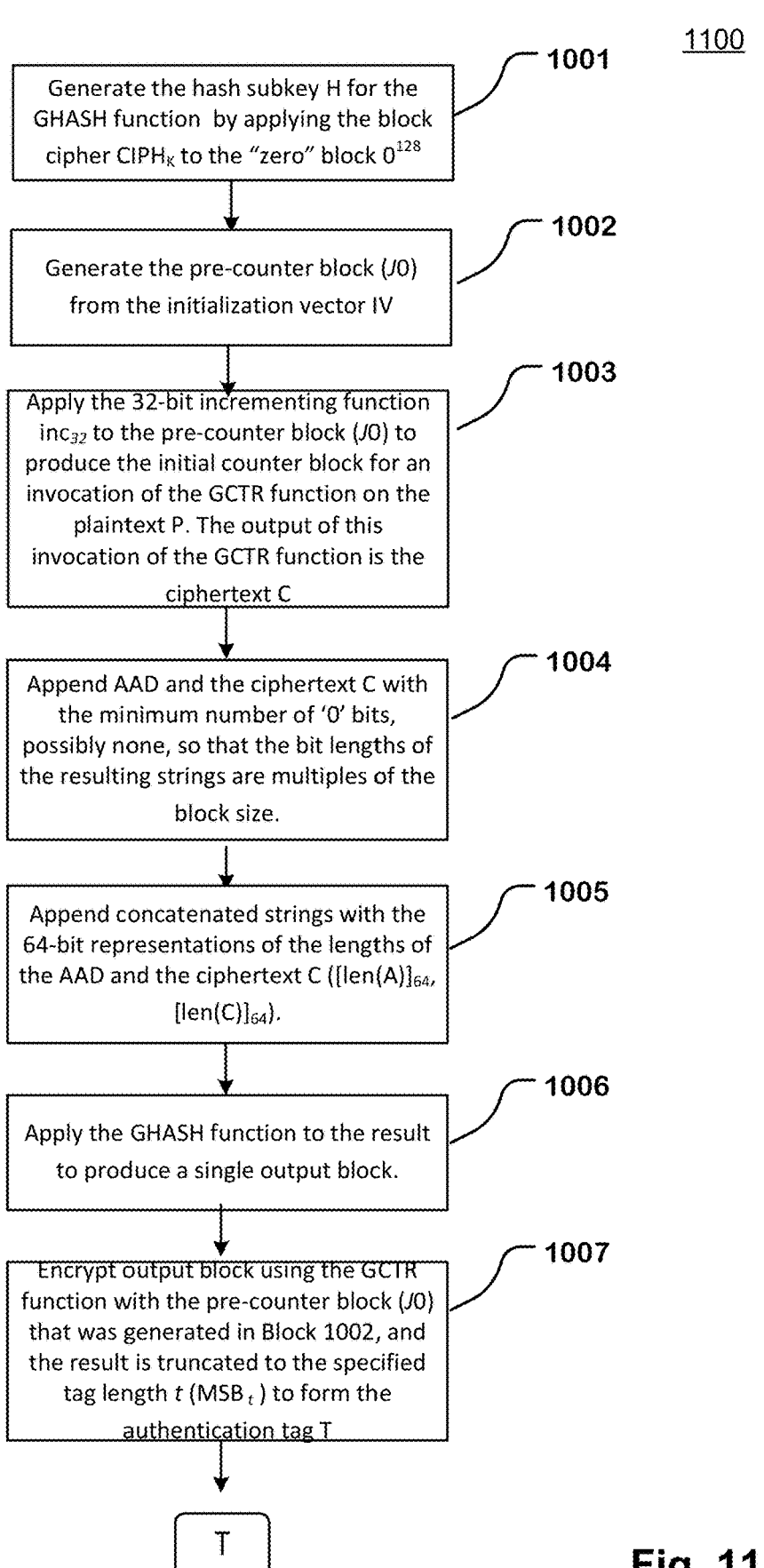

Generate the hash subkey H for the GHASH function by applying the block cipher $CIPH_K$ to the "zero" block $0^{128}$

1001

Generate the pre-counter block (J0) from the initialization vector IV

1002

Apply the 32-bit incrementing function $inc_{32}$ to the pre-counter block (J0) to produce the initial counter block for an invocation of the GCTR function on the plaintext P. The output of this invocation of the GCTR function is the ciphertext C

1003

Append AAD and the ciphertext C with the minimum number of '0' bits, possibly none, so that the bit lengths of the resulting strings are multiples of the block size.

1004

Append concatenated strings with the 64-bit representations of the lengths of the AAD and the ciphertext C ($[len(A)]_{64}$, $[len(C)]_{64}$).

1005

Apply the GHASH function to the result to produce a single output block.

1006

Encrypt output block using the GCTR function with the pre-counter block (J0) that was generated in Block 1002, and the result is truncated to the specified tag length $t$ ($MSB_t$) to form the authentication tag T

| Input_Data | PUF | Encoded Input_Data(XOR) | PUF | Decoded Output_Data(XOR again) |
|---|---|---|---|---|
| 1 | 1 | 0 | 1 | 1 |
| 1 | 0 | 1 | 0 | 1 |
| 0 | 1 | 1 | 1 | 0 |
| 0 | 0 | 0 | 0 | 0 |

Fig. 12

PUF APPLICATIONS IN MEMORIES

PRIORITY APPLICATION

This application is a continuation of U.S. patent application Ser. No. 18/231,611 filed on 8 Aug. 2023 (now U.S. Pat. No. 12,136,471), which is a continuation of Ser. No. 17/834,287, filed on 7 Jun. 2022 (now U.S. Pat. No. 11,763,867), which is a continuation of U.S. patent application Ser. No. 17/087,085 filed 2 Nov. 2020 (now U.S. Pat. No. 11,380,379), which applications are incorporated herein by reference.

BACKGROUND

Field

The present invention relates to integrated circuits which include flash memory or other non-volatile memory with applications of physically unclonable functions.

Description of Related Art

Integrated circuit memory devices comprising non-volatile memory, such as flash memory, are being developed with very high capacities. Some technologies are considered likely to enable terabit-scale arrays on integrated circuits. Also, memory devices are being deployed in so called "internet of things IoT" devices, interconnected by networks that operate with, for example, internet protocol communications technologies. A concern for IoT devices, and other devices that store data, is data security. Thus, security protocols requiring encryption with unique keys, authentication with unique IDs and challenge/response technologies are being deployed.

Security protocols require key management technologies to generate, update, store and protect the unique keys and IDs utilized.

It is desirable to provide technology for integrated circuits including non-volatile memory that secures the information stored in, retrieved from, and/or used by such integrated circuits.

SUMMARY

A memory device comprises an array of memory cells, a physically unclonable function PUF circuit in the memory device to generate a PUF code, a data path connecting a first circuit to a second circuit in the memory device coupled to the array of memory cells, and logic circuitry to encode data on the data path from the first circuit using the PUF code to produce encoded data, and to provide the encoded data to the second circuit. As used here, a physical unclonable function (PUF), also called a "physically unclonable function", is a process usable to create a unique, random key for a physical entity such as an integrated circuit. Implementations of the disclosed technology can employ a PUF for generating keys used for chip IDs. Some applications can support a hardware intrinsic security (HIS) technology. A circuit that generates a PUF is, or includes, a physical entity embodied in a physical structure which produces a code that is easy to evaluate but hard to predict.

In one representative secure memory implementation, the first circuit includes a data register registering an address, the second circuit includes an address generator coupled to the array of memory cells, and the data path includes a first path connecting the data register and the logic circuitry to encode data, and a second path connecting the logic circuitry to encode data and the address generator. The logic circuitry to encode data on the data path includes logic to encode an address on the first path from the data register using the PUF code to produce an encoded address and to provide the encoded address to the address generator via the second path. In some implementations, the logic circuitry to encode data can include an exclusive-or function using the PUF code and the data on the data path as inputs and producing an output as the encoded output data.

In another representative implementation, the first circuit includes a data register registering input data, the second circuit includes an SRAM buffer, and the data path includes a first path connecting the data register and the logic circuitry to encode data, and a second path connecting the logic circuitry to encode data and the SRAM buffer. The logic circuitry to encode data on the data path includes logic to encode input data on the first path from the data register using the PUF code to produce encoded input data and to provide the encoded input data to the SRAM buffer via the second path.

In a further representative implementation, the first circuit includes sense amplifiers coupled to the array of memory cells, the second circuit includes output buffers coupled to an input/output interface providing external access, and the data path includes a first path connecting the sense amplifiers and the logic circuitry to encode data, and a second path connecting the logic circuitry to encode data and the output buffers. The logic circuitry to encode data on the data path includes logic to encode output data on the first path from the sense amplifiers using the PUF code to produce encoded output data and to provide the encoded output data to the output buffers via the second path.

In a yet further representative implementation, the first circuit includes a first set of memory cells at a first location in the array of memory cells, the second circuit includes a second set of memory cells at a second location in the array of memory cells, and the data path includes a first path connecting the first set of memory cells and the logic circuitry to encode data, and a second path connecting the logic circuitry to encode data and the second set of memory cells. The logic circuitry to encode data on the data path includes logic to encode an original key on the first path from the first set of memory cells using the PUF code to produce an encoded key and to provide the encoded key to the second set of memory cells via the second path. The memory device can include logic to receive an original key from a source external to the memory device, and to store the original key in the first set of memory cells. The original key can include critical security parameters.

The technology disclosed is applicable to all types of memory having command interfaces. Example embodiments are described in which a memory array comprises a flash, however, the technologies described herein can be applied to other types of memory devices as well. Some embodiments implement the disclosed security mechanism in a NOR flash memory. Other embodiments implement the disclosed security mechanism in a NAND flash memory. Still other embodiments implement security command decoder mechanism in a memory that is not a flash memory.

A method is also provided for operating a memory device as described herein.

Implementations of the disclosed technology exhibit the desirable aspect that devices deploying the disclosed technology can be easy to make but produce codes that are practically impossible to duplicate or predict, even knowing the exact manufacturing process that produced it. Other aspects and advantages of the present invention can be seen on review of the drawings, the detailed description and the claims, which follow.

BRIEF DESCRIPTION OF THE DRAWINGS

FIG. 11 is a flowchart illustrating an example authenticated encryption method employing GCM using a PUF code in a memory device as described herein for a system like the device embodiment of FIG. 9.

FIG. 12 illustrates a truth table illustrating an example of using a PUF code in a memory device as described herein for a system like the device embodiment of FIG. 1.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows. A detailed description of embodiments of the present invention is provided with reference to the Figures.

Figure 1:
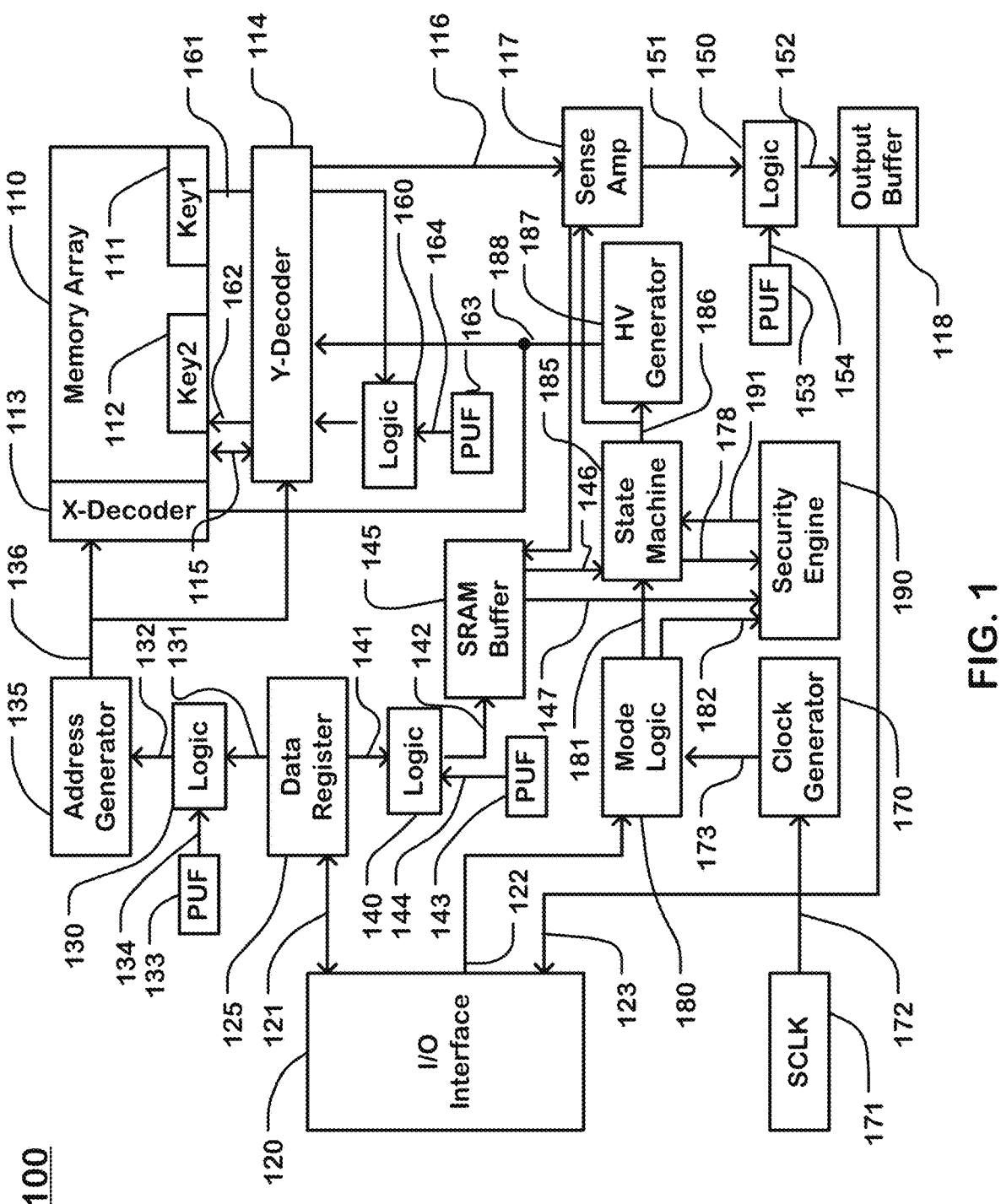
FIG. 1 is a simplified block diagram of a memory device including an array of memory cells, and logic to use a physically unclonable function PUF circuit according to an embodiment.

FIG. 1 is a simplified block diagram of a memory device including an array of memory cells, and logic to use a physically unclonable function PUF circuit according to an embodiment. Memory device 100 shown in FIG. 1 includes an array of memory cells 110, and one or more physically unclonable function PUF circuits 133, 143, 153, 163 in the memory device to generate a PUF code. The memory device includes a data path connecting a first circuit to a second circuit in the memory device coupled to the array of memory cells, and logic circuitry 130, 140, 150, 160 to encode data on the data path from the first circuit using the PUF code to produce encoded data, and to provide the encoded data to the second circuit. A PUF code can include multiple bits, such as 128 bits. A data path can include a multi-bit bus, such as a bus having 128 bits.

The memory device 100 includes an input/output interface 120, which can comprise wireless or wired ports providing access to other devices or networks external to the memory device. An input/output interface 120 can include multiple pins, including pins for serial data I/O (input and output) synchronized with a system clock signal SCLK, for receiving and/or sending address, data and command signals. The memory device 100 includes a data register 125 coupled to the input/output interface 120 via a bus 121. A data register 125 can register an address and input data received from other devices or networks via the input/output interface 120. The memory device 100 includes an address generator 135 coupled to the array of memory cells 110 via a bus 136.

In a first embodiment, the encoded data includes an encoded address. In this embodiment, the same encoding is used to write as well as read data, thereby enabling making locating the physical location of secret data difficult to tamper with because the PUF code is random and unclonable. The first circuit can include a data register 125 registering an address, and the second circuit can include an address generator 135 coupled to the array of memory cells 110. The data path can include a first path 131 connecting the data register 125 and logic circuitry 130 to encode data, and a second path 132 connecting the logic circuitry 130 to encode data and the address generator 135. The logic circuitry to encode data on the data path can include logic to encode an address on the first path from the data register using the PUF code to produce an encoded address and to provide the encoded address to the address generator via the second path. A PUF circuit 133 can generate a PUF code and provide the PUF code to the logic circuitry 130 via a bus 134. For instance, a PUF circuit 133 can include registers registering a PUF code, and connected to the logic circuitry via a bus 134. The logic circuitry 130 includes logic to encode data on the data path using the PUF code provided by the PUF circuit 133 and the address registered on the data register 125 as inputs, and producing an output as the encoded address.

In a second embodiment, the encoded data includes encoded input data. In this embodiment, encoded data is decoded prior to output by logic 150 on the output side. The PUF code for scrambling can be stored along with the scrambled data and later retrieved to enable descrambling. The input data is XOR'ed with the PUF to obtain scrambled data and then stored into the flash memory. The stored scrambled data is XOR'ed with the PUF code again to descramble back to original data before output as shown in truth table 1200 illustrated by FIG. 12.

The first circuit can include a data register 125 registering input data, and the second circuit can include an SRAM buffer 145. The data path can include a first path 141 connecting the data register 125 and logic circuitry 140 to encode data, and a second path 142 connecting the logic circuitry 140 and the SRAM buffer 145. The logic circuitry 140 to encode data on the data path can include logic to encode input data on the first path 141 from the data register 125 using the PUF circuit 143 to produce encoded input data and to provide the encoded input data to the SRAM buffer 145 via the second path 142. A PUF circuit 143 generates a PUF code and provides the PUF code to the logic circuitry 140 via a bus 144. The logic circuitry 140 includes logic to encode data on the data path using the PUF code provided by the PUF circuit 143 and the input data registered on the data register 125 as inputs, and producing an output as the encoded input data.

A word line decoder 113 is coupled to and in electrical communication with a plurality of word lines in the memory array 110. A bit line decoder 114 is in electrical communication with a plurality of bit lines 115 in the memory array 110 for reading, writing and erasing the memory cells in the memory array 110. Addresses are supplied on bus 136 to the word line decoder 113 and the bit line decoder 114. Sense amplifiers 117, including voltage and/or current sources for read, program, and erase modes are coupled to the bit line decoder 114 via a bus 116.

In a third embodiment, the encoded data includes encoded output data. In this embodiment, the PUF code for scrambling output can be stored along with the scrambled data to enable descrambling. As with the second embodiment, output data can be XOR'ed with the PUF to obtain scrambled data. The scrambled data is XOR'ed with the PUF code again to descramble back to original data. The first circuit can include sense amplifiers 117 coupled to the array of memory cells 110 for example via the bit line decoder 114, and the second circuit can include output buffers 118 coupled to an input/output interface 120 providing external access via bus 123. The data path can include a first path 151 connecting the sense amplifiers 117 and logic circuitry 150, and a second path 152 connecting the logic circuitry 150 and the output buffers 118. The logic circuitry 150 that encodes data on the data path can include logic to encode output data on the first path 151 from the sense amplifiers 117 using the PUF circuit 153 to produce encoded output data and provides the encoded output data to the output buffers 118 via the second path 152. A PUF circuit 153 generates a PUF code and provides the PUF code to the logic circuitry 150 via a bus 154. The logic circuitry 150 includes logic to encode data on the data path using the PUF code provided by the PUF circuit 153 and the output data from the sense amplifiers 117 as inputs, and producing an output as the encoded output data.

In a fourth embodiment, an original key is encoded using the PUF code to produce an encoded key. In this embodiment, the encoded/scrambled key needs to be descrambled prior to using it for cryptography. An original key can be provided to an input/output interface 120 of a memory device 100 (FIG. 1) by other devices or networks external to the memory device. The memory device can include logic to receive an original key from a source external to the memory device, and to store the original key at a first location in the array of memory cells 110. An original key can include critical security parameters. As used herein, critical security parameter (CSP) refers to security-related information (e.g., secret and private cryptographic keys, and authentication data such as passwords and PINs) whose disclosure or modification can compromise the security of a cryptographic module.

In this embodiment, the first circuit can include a first set of memory cells 111 at a first location in the array of memory cells, and the second circuit can include a second set of memory cells 112 at a second location in the array of memory cell. The data path can include a first path 161 connecting the first set of memory cells 111 and logic circuitry 160, and a second path 162 connecting the logic circuitry 160 and the second set of memory cells 112. Logic circuitry 160 can include logic to encode an original key Key1 on the first path from the first set of memory cells 111 using the PUF code to produce an encoded key Key2 and to provide the encoded key Key2 to the second set of memory cells 112 via the second path. A PUF circuit 163 generates the PUF code and provides the PUF code to the logic circuitry 160 via a bus 164. The logic circuitry 160 includes logic to encode data on the data path using the PUF code provided by the PUF circuit 163 and the original key from the first set of memory cells 111 as inputs, and producing an output as the encoded key. The encoded key is stored in the second set of memory cells 112 at the second location in the array of memory cell.

An external system clock SCLK can be provided to the memory device at a port 171. Clock generator 170 can receive a system clock signal SCLK from the port 171 via a signal line 172, and provide an internal clock 173 to a mode logic circuit 180, and/or other internal clocks to other internal circuits in the memory device 100. A mode logic circuit 180 can receive command signals from an input/output interface 120 via line 122, decode the command signals for various modes (read, write, erase), and send decoded signals to state machine 185 via a line 181 for executing read, write, erase operations on the array of memory cells. State machine 185 can receive signals from SRAM buffer 145 via a line 146, receive signals from mode logic circuit 180 via a line 181, and generate signals 186 for sense amplifiers 117 and a high voltage generator 187. For high voltage operation, e.g., for a write operation, high voltage generator 187 is activated to control the application of bias arrangement supply voltages and current sources, such as read, write and erase voltages and/or currents for the memory array 110 via line 188.

Security engine 190 is coupled to the mode logic circuit 180 via a line 182, is coupled to the SRAM buffer 145 via a line 147, and is coupled to the state machine 185 via a line 178 and a line 191. Security engine 190 can include logic for handling a challenge input from the state machine 185 via line 178 and providing a response output to the state machine 185 via line 191 using inputs from the mode logic circuit 180 and encoded input data from the SRAM buffer 145. The security engine 190 can process a challenge input from the state machine using encryption/decryption, Hash Message Authentication Code (HMAC) or analogous techniques familiar to those knowledgeable in the art.

In embodiments, logic circuitry (130, 140, 150, 160) that encodes data on the data path using the PUF code can include an exclusive-or (XOR) function using data on the data path and the PUF code as inputs and producing an output as the encoded data, as further described in reference to FIGS. 2-5. Data can be XOR'ed with the PUF to obtain scrambled data. The scrambled data is XOR'ed with the PUF code again to descramble back to original data. Alternatively, the logic circuitry can use other logic suitable for encoding data on the data path using the PUF code.

Figure 2:
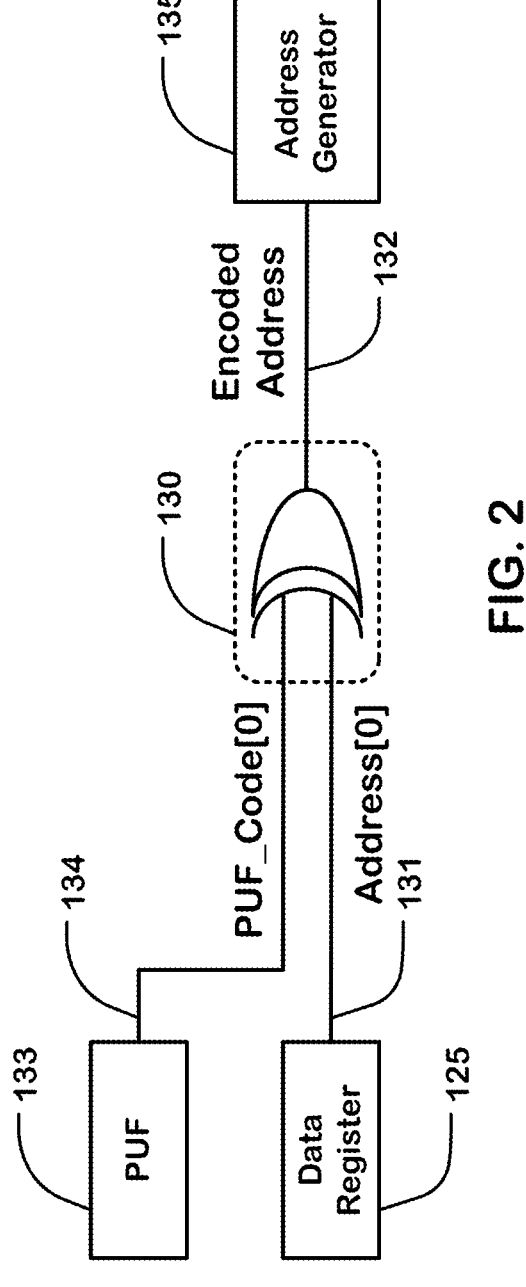
FIG. 2 illustrates an example data path producing an encoded address as described herein for a system like the device embodiment of FIG. 1.

FIG. 2 illustrates an example data path producing an encoded address as described herein for a system like the device embodiment of FIG. 1. In the embodiment depicted by FIG. 2, a PUF circuit 133 can generate a multi-bit PUF code having a number N of bits, for example N=128, and provide the PUF code to the logic circuitry 130 via a bus 134 having a number N of bits. A data register 125 can register an address having a number N of bits. A data path, including a first path 131 and a second path 132, can include a multi-bit bus, such as a bus having a number N of bits. Although only 1 bit of the PUF code PUF_Code[0] and only 1 bit of the address Address[0] are shown in FIG. 2 for clarity sake, the PUF code can have a number N of bits and the address can have a number N of bits, where N>1, e.g. N=128. Logic circuitry 130 includes logic to encode data on the data path using the PUF code generated. Logic circuitry 130 can include an exclusive-or (XOR) function, including a number N of XOR gates in parallel. Logic circuitry 130 can use the N-bit PUF code and the N-bit address as inputs connected to respective XOR gates in the number N of XOR gates, and produce an output as an encoded address having a number N of bits to an address generator 135 via the second path 132 in the data path. Alternatively, logic circuitry 130 can use other logic suitable for encoding the address using the PUF code.

Figure 3:
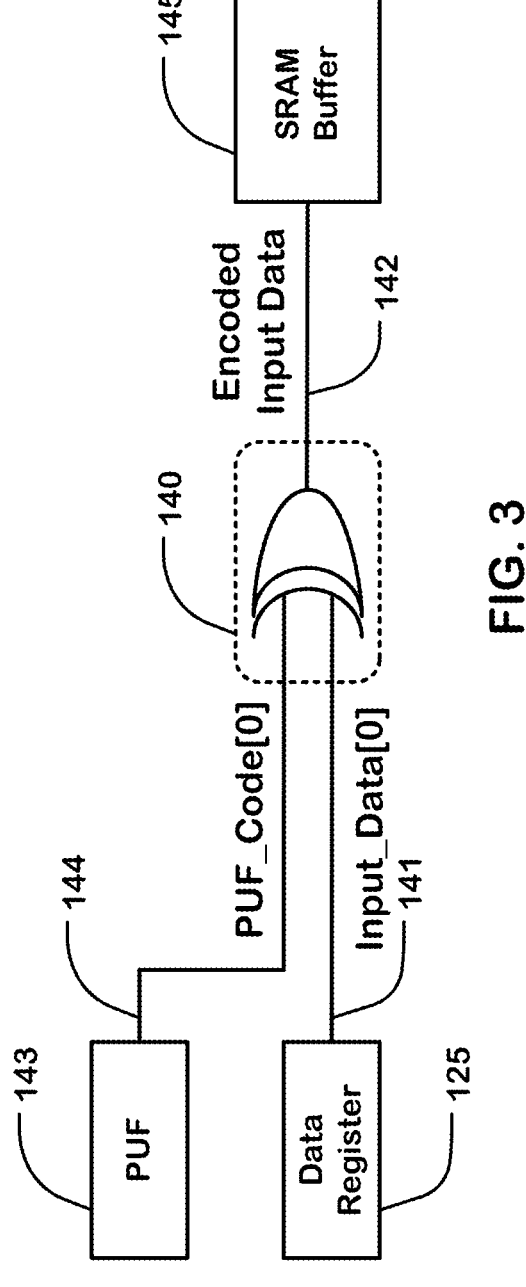
FIG. 3 illustrates an example data path producing encoded input data as described herein for a system like the device embodiment of FIG. 1.

FIG. 3 illustrates an example data path producing encoded input data as described herein for a system like the device embodiment of FIG. 1. In the embodiment depicted by FIG. 3, a PUF circuit 143 can generate a multi-bit PUF code having a number N of bits, for example N=128, and provide the PUF code to the logic circuitry 140 via a bus 144 having a number N of bits. A data register 125 can register input data having a number N of bits. A data path, including a first path 141 and a second path 142, can include a multi-bit bus, such as a bus having a number N of bits. Although only 1 bit of the PUF code PUF_Code[0] and only 1 bit of the input data Input_Data[0] are shown in FIG. 3 for clarity sake, the PUF code can have a number N of bits and the input data can have a number N of bits, where N>1, e.g. N=128. Logic circuitry 140 includes logic to encode data on the data path using the PUF code generated. Logic circuitry 140 can include an exclusive-or (XOR) function, including a number N of XOR gates in parallel. Logic circuitry 140 can use the N-bit PUF code and the N-bit input data as inputs connected to respective XOR gates in the number N of XOR gates, and produce an output as encoded input data having a number N of bits to an SRAM buffer 145 via the second path 142 in the data path. Alternatively, logic circuitry 140 can use other logic suitable for encoding the input data using the PUF code.

Figure 4:
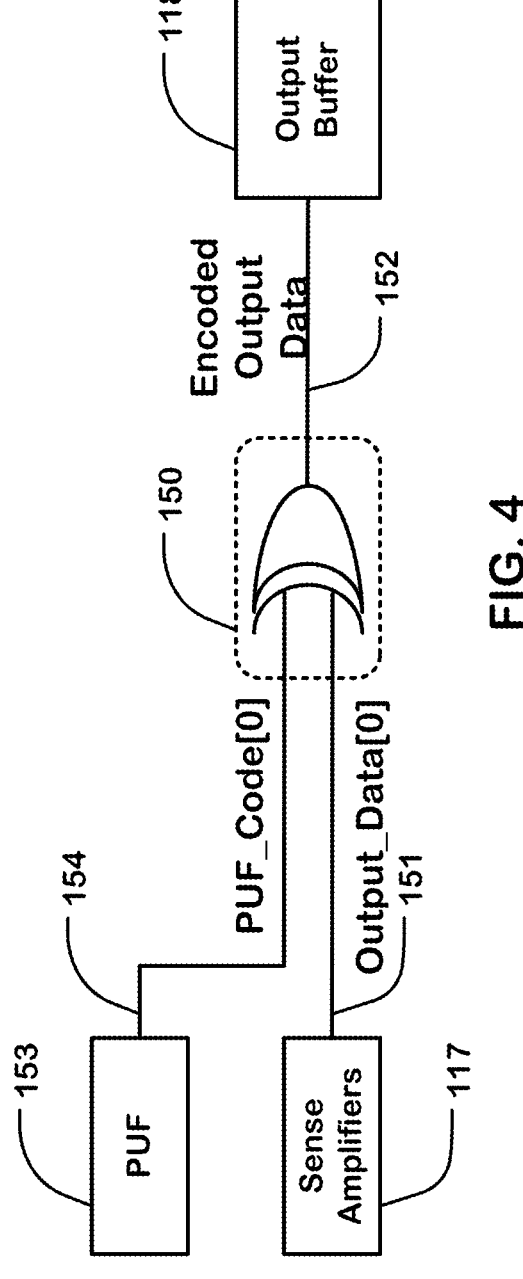
FIG. 4 illustrates an example data path producing encoded output data as described herein for a system like the device embodiment of FIG. 1.

FIG. 4 illustrates an example data path producing encoded output data as described herein for a system like the device embodiment of FIG. 1. In the embodiment depicted by FIG. 4, a PUF circuit 153 can generate a multi-bit PUF code having a number N of bits, for example N=128, and provide the PUF code to the logic circuitry 150 via a bus 154 having a number N of bits. Sense amplifiers 117 can provide output data having a number N of bits. A data path, including a first path 151 and a second path 152, can include a multi-bit bus, such as a bus having a number N of bits. Although only 1 bit of the PUF code PUF_Code[0] and only 1 bit of the output data Output_Data[0] are shown in FIG. 4 for clarity sake, the PUF code can have a number N of bits and the output data can have a number N of bits, where N>1, e.g. N=128. Logic circuitry 150 includes logic to encode data on the data path using the PUF code generated. Logic circuitry 150 can include an exclusive-or (XOR) function, including a number N of XOR gates in parallel. Logic circuitry 150 can use the N-bit PUF code and the N-bit output data as inputs connected to respective XOR gates in the number N of XOR gates, and produce an output as encoded output data having a number N of bits to output buffer 118 via the second path 152 in the data path. Alternatively, logic circuitry 150 can use other logic suitable for encoding the output data using the PUF code.

Figure 5:
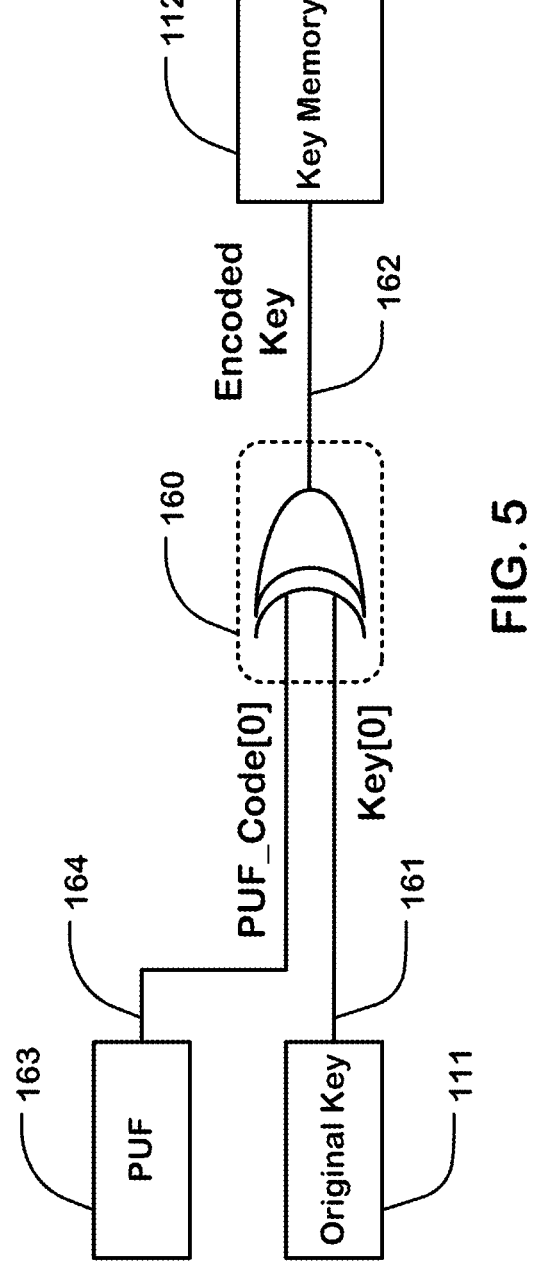
FIG. 5 illustrates an example data path producing an encoded key as described herein for a system like the device embodiment of FIG. 1.

FIG. 5 illustrates an example data path producing an encoded key as described herein for a system like the device embodiment of FIG. 1. In the embodiment depicted by FIG.

5, a PUF circuit 163 can generate a multi-bit PUF code having a number N of bits, for example N=128, and provide the PUF code to the logic circuitry 160 via a bus 164 having a number N of bits. A first set of memory cells 111 at a first location in the array of memory cells 110 can provide an original key having a number N of bits. A data path, including a first path 161 and a second path 162, can include a multi-bit bus, such as a bus having a number N of bits. Although only 1 bit of the PUF code PUF_Code[0] and only 1 bit of the key Key[0] are shown in FIG. 5 for clarity sake, the PUF code can have a number N of bits and the key can have a number N of bits, where N>1, e.g. N=128. Logic circuitry 160 includes logic to encode data on the data path using the PUF code generated. Logic circuitry 160 can include an exclusive-or (XOR) function, including a number N of XOR gates in parallel. Logic circuitry 160 can use the N-bit PUF code and the N-bit output data as inputs connected to respective XOR gates in the number N of XOR gates, and produce an output as an encoded key having a number N of bits to a second set of memory cells 112 at a second location in the array of memory cell via the second path 162 in the data path. Alternatively, logic circuitry 160 can use other logic suitable for encoding an original key using the PUF code.

Figure 6:
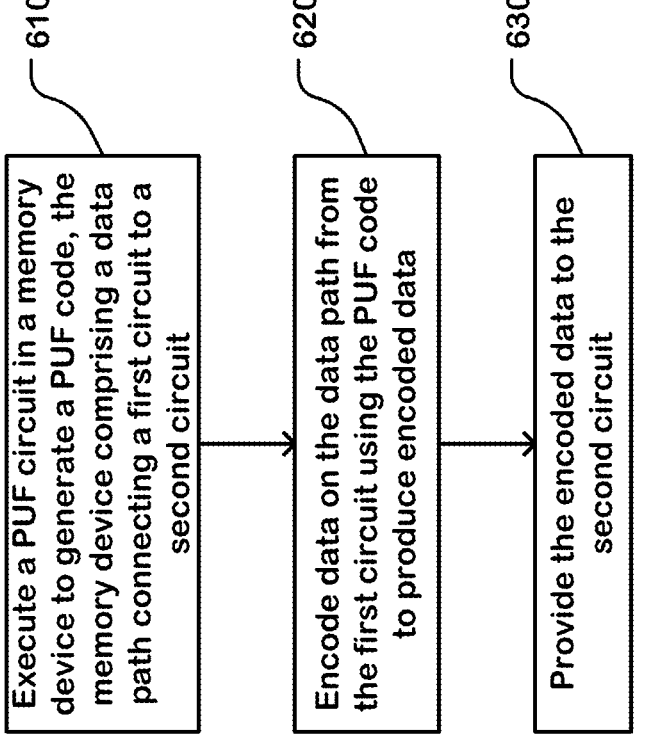
FIG. 6 is a flowchart illustrating an example method for using a PUF code in a memory device as described herein for a system like the device embodiment of FIG. 1.

FIG. 6 is a flowchart illustrating an example method for using a PUF code in a memory device as described herein for a system like the device embodiment of FIG. 1. A memory device can comprise an array of memory cells, a physically unclonable function PUF circuit, a data path connecting a first circuit to a second circuit in the memory device coupled to the array of memory cells, and logic circuitry to encode data on the data path.

At Step 610, the physically unclonable function PUF circuit can be executed to generate a PUF code. At Step 620, data on the data path from the first circuit can be encoded using the PUF code to produce encoded data. At Step 630, the encoded data can be provided to the second circuit.

In one representative secure memory implementation, as shown in the example of FIG. 2, the encoded data includes an encoded address. The first circuit can include a data register 125 registering an address, the second circuit can include an address generator 135 coupled to the array of memory cells 110, and the data path can include a first path 131 connecting the data register 125 and the logic circuitry to encode data 130, and a second path 132 connecting the logic circuitry to encode data and the address generator 135. In this embodiment, the method can include encoding an address on the first path 131 from the data register 125 using the PUF code to produce an encoded address, and providing the encoded address to the address generator 135 via the second path 132.

In another representative implementation, as shown in the example of FIG. 3, the encoded data includes encoded input data. The first circuit can include a data register 125 registering input data, and the second circuit includes an SRAM buffer 145. The data path can include a first path 141 connecting the data register 125 and logic circuitry 140, and a second path 142 connecting the logic circuitry 140 and the SRAM buffer 145. In this embodiment, the method can include encoding input data on the first path from the data register 125 using the PUF code to produce encoded input data, and providing the encoded input data to the SRAM buffer 145 via the second path 142.

In a further representative implementation, as shown in the example of FIG. 4, the encoded data includes encoded output data. The first circuit can include sense amplifiers 117 coupled to the array of memory cells 110 for example via the bit line decoder 114, and the second circuit can include output buffers 118 coupled to an input/output interface 120 via bus 123. The data path can include a first path 151 connecting the sense amplifiers 117 and the logic circuitry to encode data 150, and a second path connecting the logic circuitry to encode data 150 and the output buffers 118. In this embodiment, the method can include encoding output data on the first path 151 from the sense amplifiers 117 using the PUF code to produce encoded output data, and providing the encoded output data to the output buffers 118 via the second path 152.

In a yet further representative implementation, as shown in the example of FIG. 5, an original key is encoded using the PUF code to produce an encoded key. The first circuit can include a first set of memory cells 111 at a first location in the array of memory cells, and the second circuit can include a second set of memory cells 112 at a second location in the array of memory cell. The data path can include a first path 161 connecting the first set of memory cells 111 and logic circuitry 160, and a second path 162 connecting logic circuitry 160 and the second set of memory cells 112. In this embodiment, the method can include encoding an original key on the first path 161 from the first set of memory cells 111 using the PUF code to produce an encoded key, and providing the encoded key to the second set of memory cells 112 via the second path 162.

Figure 7:
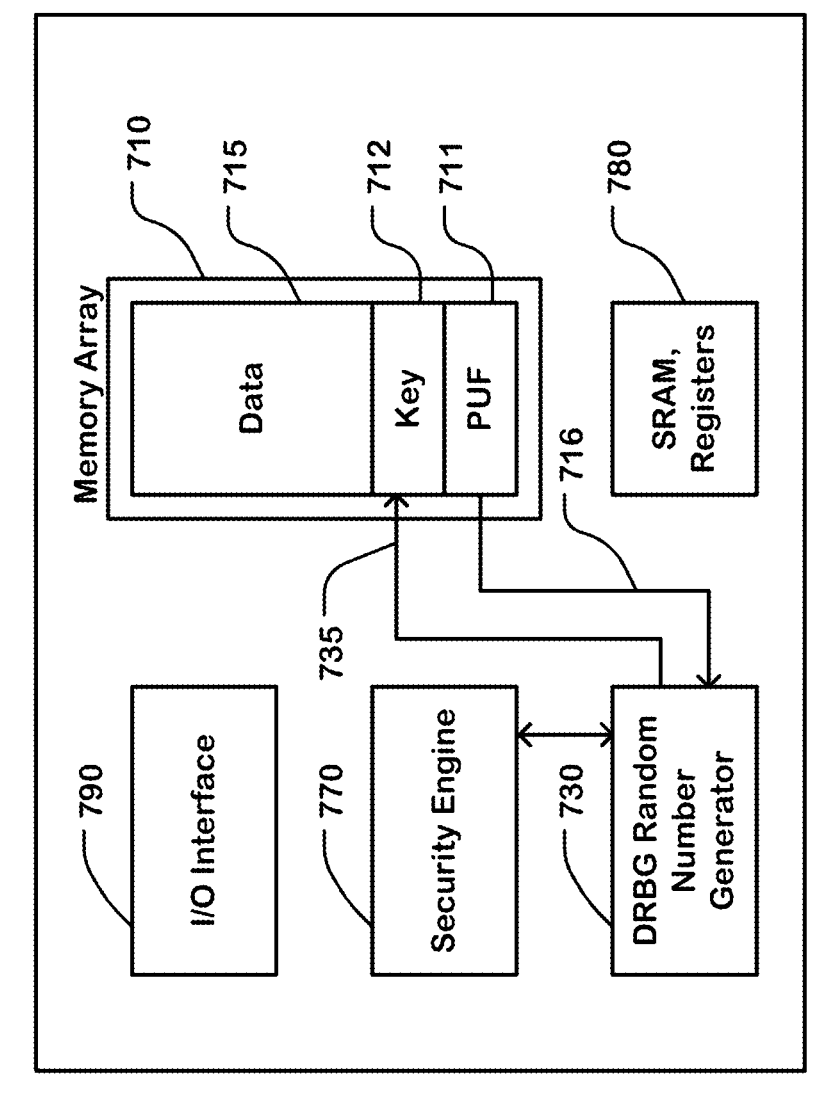
FIG. 7 is a simplified block diagram of a memory device including an array of memory cells and a DRBG random number generator according to another embodiment.

FIG. 7 is a simplified block diagram of a memory device 700 including an array of memory cells 710 and a DRBG random number generator 730 according to another embodiment. As shown in FIG. 7, memory device 700 can comprise a memory array 710, a Deterministic Random Bit Generator (DRBG) random number generator 730, security engine 770, SRAM registers 780 and I/O interface 790.

Figure 8A:
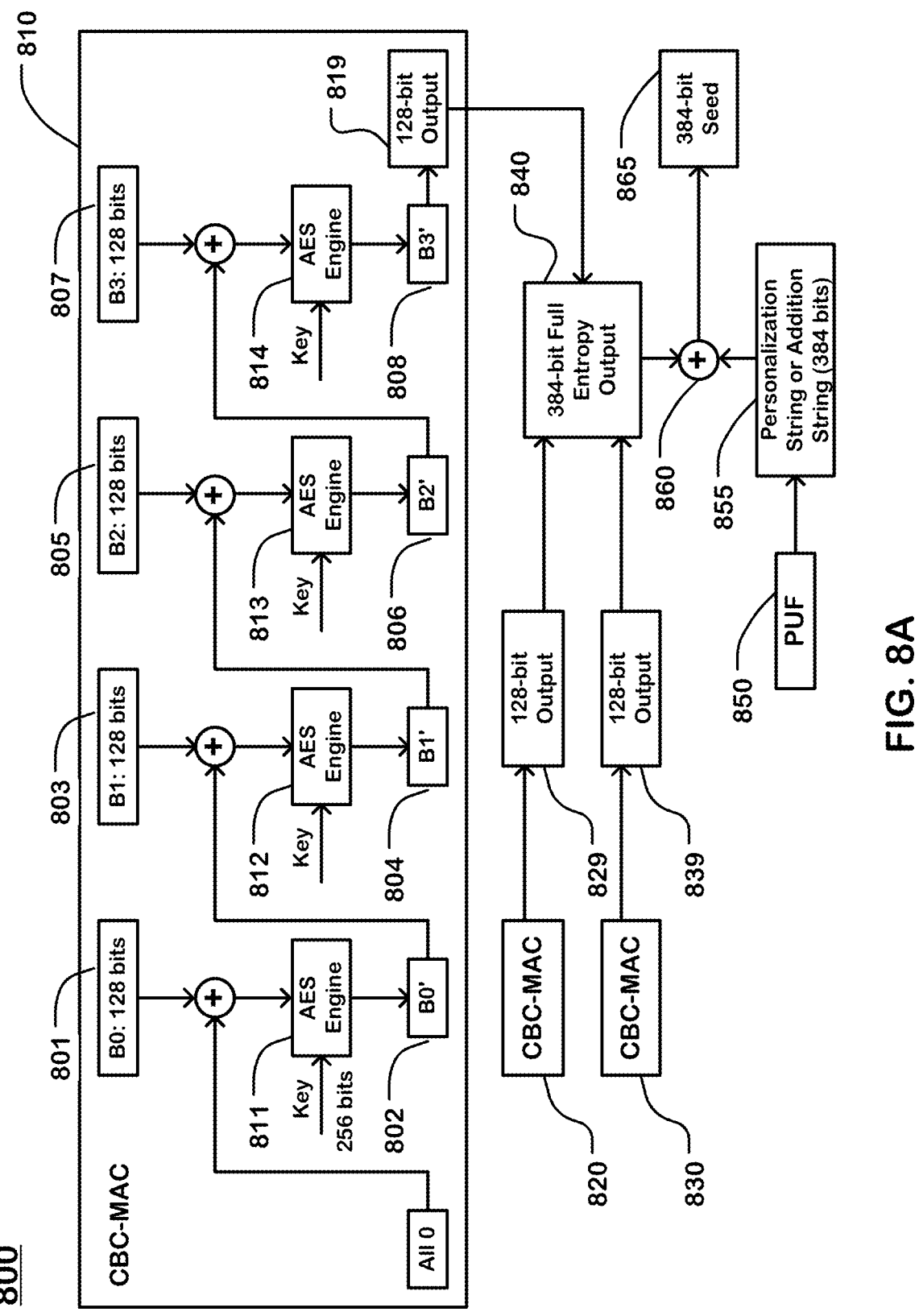
FIG. 8A illustrates a circuit for generating an initial value for a random number generator as described herein for a system like the device embodiment of FIG. 7.

An array of memory cells 710 can include a user data area 715 for storing user data, a first set of memory cells 711 at a first location in the array of memory cells, and a second set of memory cells 712 at a second location in the array of memory cell. The first and second locations are outside the user data area. Now with reference to FIG. 8A, which illustrates a circuit for generating an initial value for a random number generator as described herein for a system like the device embodiment of FIG. 7, a PUF code, such as a 384-bit PUF code 855 of FIG. 8A is generated by a physically unclonable function PUF 850 of FIG. 8A, can be referred to as a personalization string or an addition string. With renewed reference to FIG. 7, A PUF code 855 of FIG. 8A can be stored in the first set of memory cells 711 of FIG. 7 and provided to a random number generator 730 via a line 716. A key, such as generated by a random number generator 730, can be provided via a line 735 and be stored in the second set of memory cells 712.

A random number generator 730, such as a Deterministic Random Bit Generator (DRBG), can generate a sequence of numbers whose properties approximate the properties of sequences of random numbers. A DRBG generated sequence is determined by an initial value, such as a 384-bit seed generated by a circuit 800 including cipher block chaining message authentication code (CBC-MAC) blocks as shown in FIG. 8A. CBC-MAC is a technique for constructing a message authentication code from a block cipher. A sequence of numbers generated by a random number generator 730 can be stored as a key in a second set of memory cells 712 in the memory array 710. For background information about DRBG, reference can be had to a NIST Special Publication 800-90A January 2012, titled "Recommendation for Random Number Generation Using Deterministic Random Bit Generators", which is incorporated by reference as if fully set forth herein.

The memory device 700 includes a security engine 770 which can include circuits implementing the Advanced Encryption Standard (AES), the Hash-based Message Authentication Code (HMAC), etc. for conducting encryption/decryption operations on data stored by memory device 700 and/or conducting MAC calculation for authentication. The security engine 770 is coupled to a random number generator 730 enabling the sequence of numbers generated by random number generator 730 to be used by the security engine 770 as initial values for conducting encryption of data and/or address information stored by memory device 700. In one implementation, CMC-MAC implements an entropy source conditioning applied before DRBG functions.

The memory device 700 includes SRAM and/or registers in a block 780 for registering data on data paths coupled to an array of memory cells 710.

The memory device 700 includes an input/output interface 790, which can comprise wireless or wired ports providing access to other devices or networks external to the memory device. An input/output interface 790 can include multiple pins, including pins for serial data I/O (input and output), for receiving and/or sending address, data and command signals. For instance, an input/output interface 790 can support Serial Peripheral Interface (SPI), Inter-Integrated Circuit (I2C), etc.

FIG. 8A illustrates a circuit for generating an initial value for a random number generator as described herein for a system like the device embodiment of FIG. 7. The circuit 800 includes first, second and third CBC-MAC (Cipher Block Chaining Message Authentication Code) blocks 810, 820, 830 generating first, second and third CBC-MAC outputs 819, 829, 839, respectively. Each of the first, second and third CBC-MAC outputs can include 128 bits. The first, second and third CBC-MAC outputs are combined into a 384-bit full entropy (e.g., completely random and having no meaningful patterns) output 840.

A PUF circuit 850 can generate a 384-bit PUF code 855, referred to as a personalization string or an addition string. The 384-bit full entropy output 840 and the 384-bit PUF code 855 are inputs to an instantiate function 860 to produce a 384-bit seed 865, referred to as an initial value. The 384-bit seed 865 is used by DBRG 730 of FIG. 7 to generate a pseudorandom output 735, using processing further described in reference to FIG. 8B.

With continuing reference to FIG. 8A, a CBC-MAC block, such as the first CBC-MAC block 810, includes circuitry implementing constructing a message authentication code from a block cipher. (By verifying the message authentication code is correct, a recipient can verify that the message has not been tampered with after sending but prior to receiving it.) A message is encrypted with some block cipher algorithm in CBC mode to create a chain of blocks (801, 803, 805, 807) such that encryption at each block depends on the encryption result of the previous block (e.g., encryption of block 803 depends upon a result 802 of a prior encryption stage encrypting block 801 for example). A message can include multiple blocks B0, B1, B2, B3, etc, each including 128 bits. The message can be data to be stored into or retrieved from user data area 715 of memory array 710 for example. When CMC-MAC is used for entropy source conditioning, blocks B0-B3, etc. would be the random bits from random number generator. Although four blocks (801, 803, 805, 807) are shown by FIG. 8A for a message, a message can include more than four blocks. The chain of blocks is initialized with a zero initialization vector "All 0". The CBC-MAC of a message is computed using a secret key Key and a block cipher 811-814. For instance, a block cipher can be an AES engine, implementing algorithms in the Advanced Encryption Standard (AES). The AES can include three block ciphers: AES-128, AES-192 and AES-256, using a 128-bit key length, a 192-bit key length, and a 256-bit key length, respectively. Although a 256-bit key length is shown in FIG. 8A, a 128-bit key length and a 192-bit key length can be used in embodiments.

Block ciphers 811, 812, 813 and 814 produce the encryption results B0', B1', B2' and B3' (802, 804, 806, 808), respectively. The encryption result at the last block, e.g. block B3, produces a 128-bit output from a CBC-MAC block, such as the first CBC-MAC output 819 from the first CBC-MAC block 810. Encryption at each block depends on the encryption result of the previous block. For instance, encryption at block B1 803 depends on the encryption result B0' 802 of the previous block B0 801, encryption at block B2 805 depends on the encryption result B1' 804 of the previous block B1 803, and encryption at block B3 807 depends on the encryption result B2' 806 of the previous block B2 805.

Figure 8B:
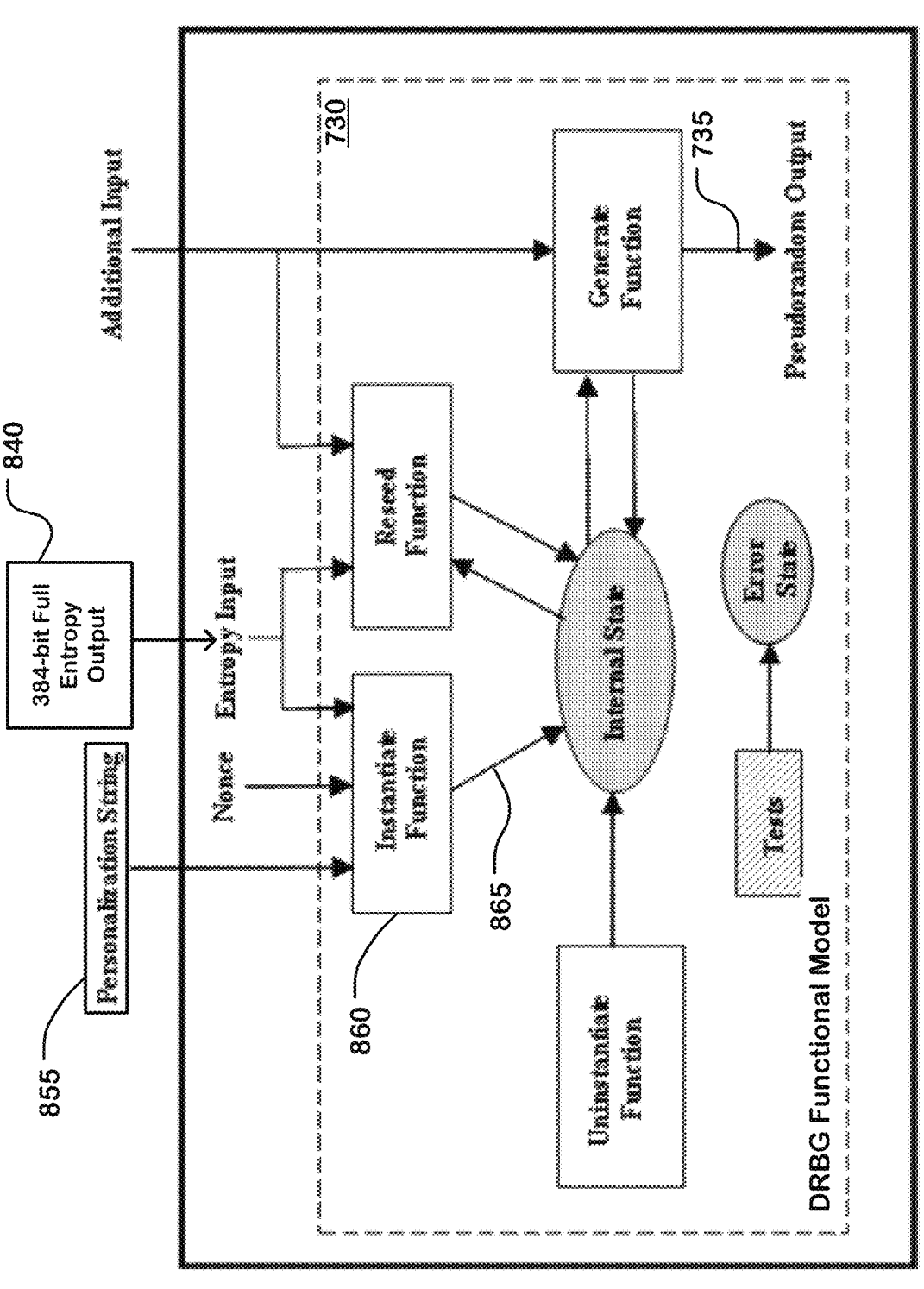
FIG. 8B illustrates a DRBG functional model as described herein for a system like the device embodiment of FIG. 7.

FIG. 8B illustrates a DRBG functional model as described herein for a system like the device embodiment of FIG. 7. A DRBG functional model of DBRG random number generator 730 that generates a pseudorandom output 735 from a seed. A seed 865 can be constructed by an instantiate function 860 from inputs including a personalization string 855, and an entropy input. A personalization string 855 can be provided by a PUF circuit 850 (FIG. 8A), and an entropy input can be provided by a 384-bit full entropy output 840 (FIG. 8A). In implementations, the instantiate, seed/reseed function could be AES CTR. The skilled person may have reference to NIST Special Publication 800-90a June 2015, titled "Recommendation for Random Number Generation Using Deterministic Random Bit Generators", which is incorporated by reference as if fully set forth herein.

Figure 9:
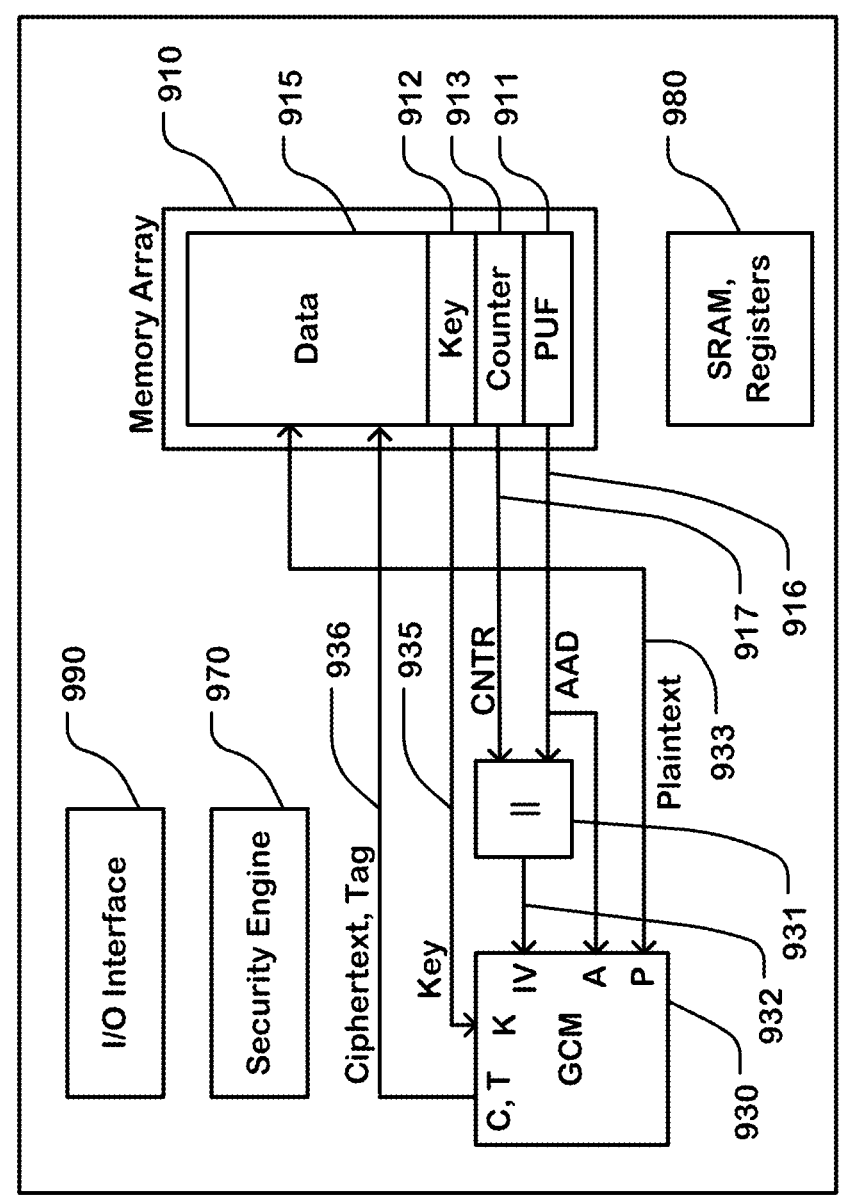
FIG. 9 is a simplified block diagram of a memory device including an array of memory cells and a GCM circuit according to a yet further embodiment.

FIG. 9 is a simplified block diagram of a memory device including an array of memory cells and a GCM circuit according to a yet further embodiment. As shown in FIG. 9, a memory device 900 includes an array of memory cells 910 and a GCM circuit 930 implementing functions of GCM (Galois/Counter Mode). GCM is described in NIST Special Publication 800-38D November 2007, titled "Recommendation for Block Cipher Modes of Operation: Galois/Counter Mode (GCM) and GMAC", which is incorporated by reference as if fully set forth herein.

An array of memory cells 910 can include a user data area 915 for storing user data, a first set of memory cells 911 at a first location in the array of memory cells, and a second set of memory cells 912 at a second location in the array of memory cell. The first and second locations are outside the user data area 915. A PUF code, such as an additional authenticated data (AAD) generated by a PUF circuit, can be stored in the first set of memory cells 911 and provided to a GCM circuit 930 via a line 916. A key, such as an authentication tag generated by a GCM circuit 930, can be provided via a line 935 and stored in the second set of memory cells 912. The array of memory cells 910 can include a counter 913.

The GCM circuit 930 can include three input strings: a plaintext denoted P, additional authenticated data (AAD) denoted A, and an initialization vector denoted IV, and two output strings: a ciphertext denoted C and an authentication tag denoted T. In a GCM function, a plaintext P is encrypted into a ciphertext C, and an authentication tag T is generated from additional authenticated data AAD and the ciphertext C. GCM is further described in reference to FIG. 10.

A circuit for constructing initialization vectors (IVs) is implemented by a deterministic construction. In the deterministic construction, the IV is the concatenation of two fields, called the fixed field and the invocation field. In an implementation, the fixed field identifies the device or more generally the context for the instance of the authenticated encryption function. The invocation field identifies the sets of inputs to the authenticated encryption function in that particular device. A PUF code stored in the first set of memory cells 911 can be the fixed field. A counter output from an integer counter 913 stored in the array of memory cells 910 can be the invocation field. The PUF code can be included in the additional authenticated data (AAD) which is provided to the AAD input A of a GCM circuit 930 in a GCM circuit 930 via a line 916. The counter output can be provided to a GCM circuit 930 via a line 917. A concatenation function 931 can concatenate the PUF code and the counter output to produce an initialization vector IV. An initialization vector IV can be provided to the initialization vector input IV of the GCM circuit 930 via a line 932. A plaintext is provided to a plaintext input P of the GCM circuit 930 via a line 933. The plaintext can be data to be stored into or retrieved from user data area 915 of the memory array 910 for example. The counter can be volatile counter or non-volatile retrieved from memory array 910.

The GCM circuit 930 can produce an authentication tag T, and a ciphertext C. An encryption key K stored by second set of memory cells 912 at a second location in the array of memory cells 910 can be provided to GCM 930 via a line 935. Once plaintext 933 are encrypted to ciphertext, the ciphertext and Tag can be output to the user and/or stored in user data area 915 of memory array 910.

The memory device 900 includes a security engine 970 which can include circuits implementing the Advanced Encryption Standard (AES), the Hash-based Message Authentication Code (HMAC), etc. for conducting encryption/decryption operations on data stored by memory device 900 and/or conducting MAC calculation for authentication. The security engine 970 implements a GCM mode of operation (e.g., circuit 930) in accordance with NIST SP 800-38d for conducting encryption/decryption operations. Of course, AES GCM is one type of encryption/decryption technique used by some implementations.

The memory device 900 includes SRAM and/or registers in a block 980 for registering data on data paths coupled to a memory array 910. The memory device 900 includes an input/output interface 990, which can comprise wireless or wired ports providing access to other devices or networks external to the memory device. An input/output interface 990 can include multiple pins, including pins for serial data I/O (input and output), for receiving and/or sending address, data and command signals. For instance, an input/output interface 990 can support Serial Peripheral Interface (SPI), Inter-Integrated Circuit (I2C), etc.

Figure 10:
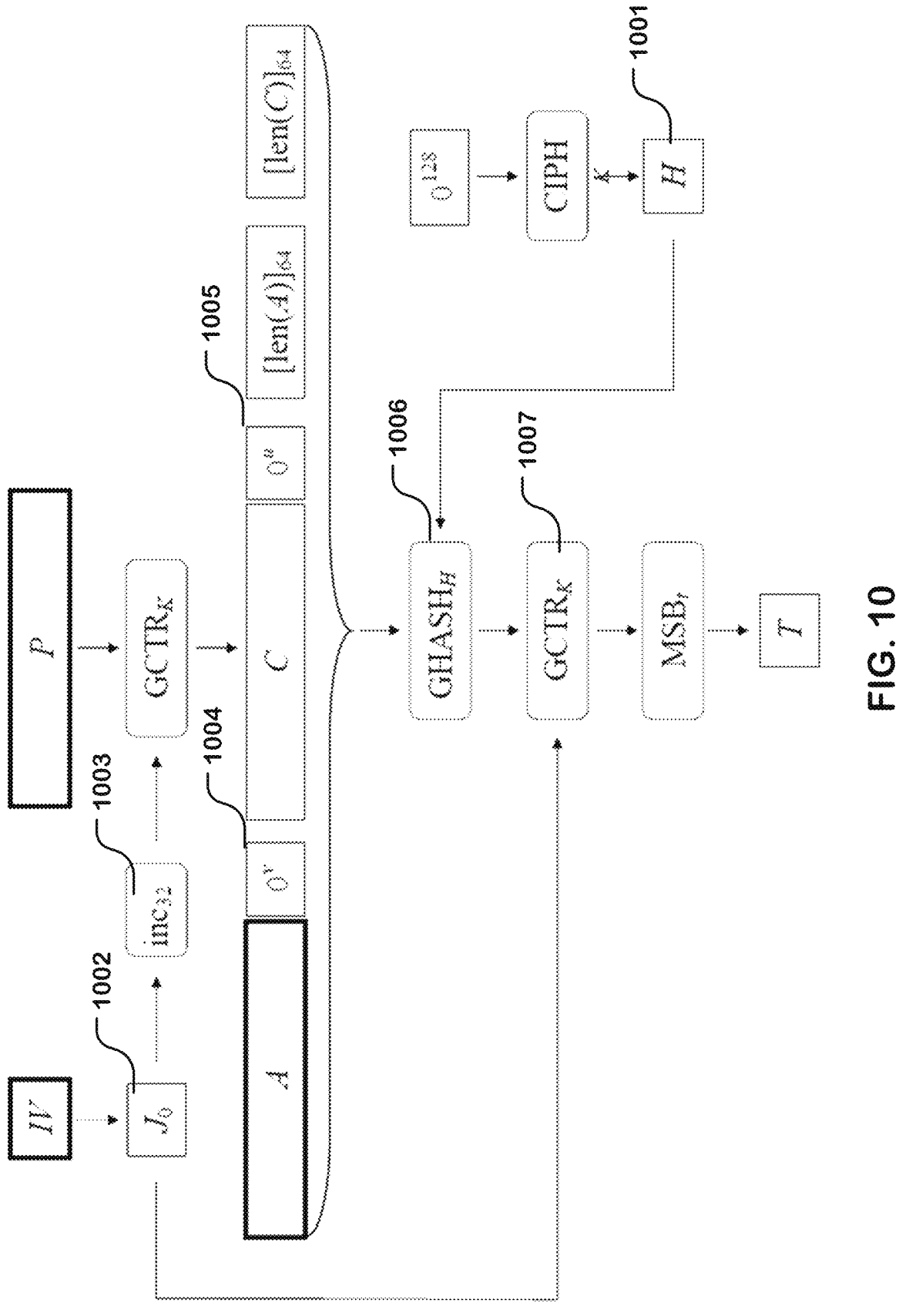
FIG. 10 illustrates an authenticated encryption function of GCM as described herein for a system like the device embodiment of FIG. 9.

FIG. 10 illustrates an authenticated encryption function of GCM (Galois/Counter Mode) as described herein for a system like the device embodiment of FIG. 9. In this embodiment, a plaintext is encrypted into a ciphertext, and an authentication tag is generated from additional authenticated data (AAD) and the ciphertext.

As used herein, additional authenticated data AAD refers to the input data to the authenticated encryption function that is authenticated but not encrypted. An authentication tag refers to a cryptographic checksum on data that is designed to reveal both accidental errors and the intentional modification of the data. A ciphertext refers to the encrypted form of the plaintext. A plaintext refers to the input data to the authenticated encryption function that is both authenticated and encrypted.

Variables used in the GCM include:

| | |
|---|---|
| A | Additional authenticated data |
| C | Ciphertext |
| H | Hash subkey |
| IV | Initialization vector |
| K | Block cipher key |
| P | Plaintext |
| T | Authentication tag |
| t | Bit length of the authentication tag |
| $0^S$ | Bit string that consists of s '0' bits |
| CIPH | Approved block cipher with a 128-bit block size |
| $GCTR_K$ | Output of the GCTR function for a given block cipher with key K applied to a bit string |
| $GHASH_H$ | Output of the GHASH function under the hash subkey H applied to a bit string |
| $inc_S$ | Output of incrementing the right-most s bits of a bit string |
| len(X) | Bit length of a bit string X |
| $MSB_t$ | Bit string consisting of the t left-most bits of a bit string |

As shown in FIG. 10 and FIG. 11, the authenticated encryption function of GCM includes the steps:

1. Let $H=CIPH_K(0^{128})$.
2. Define a block, $J_0$, as follows:
   If len(IV)=96, then let $J_0=IV\|0^{31}\|1$.
   If len(IV)≠96, then let $s=128\lceil len(IV)/128\rceil$-len(IV), and let $J_0=GHASH_H(IV\|0^{s+64}\|[len(IV)]_{64})$.
3. Let $C=GCTR_K(inc_{32}(J_0), P)$.
4. Let $u=128\cdot\lceil len(C)/128\rceil$-len(C) and let $v=128\cdot\lceil len(A)/128\rceil$-len(A).
5. Define a block, S, as follows:
   $S=GHASH_H(A\|0^v\|C\|0^u\|[len(A)]_{64}\|[len(C)]_{64})$.
6. Let $T=MSB_t(GCTR_K(J_0, S))$.

There are three input strings to the authenticated encryption function of GCM: a plaintext denoted P, additional authenticated data (AAD) denoted A, and an initialization vector IV. GCM protects the authenticity of the plaintext and the AAD. There are two output strings from the authenticated encryption function of GCM: a ciphertext denoted C whose bit length is the same as that of the plaintext, and an authentication tag, or tag, denoted T. Mathematical components of GCM include an incrementing function $inc_s$, multiplication operation on blocks, a GHASH function and a GCTR function.

FIG. 11 is a flowchart illustrating an example authenticated encryption method employing GCM using a PUF code in a memory device as described herein for a system like the device embodiment of FIG. 9.

In Block 1001, the hash subkey H for the GHASH function is generated by applying the block cipher $CIPH_K$ to the "zero" block $0^{128}$.

In Block 1002, the pre-counter block (J0) is generated from the initialization vector IV.

In Block 1003, the 32-bit incrementing function $inc_{32}$ is applied to the pre-counter block (J0) to produce the initial counter block for an invocation of the GCTR function on the plaintext P. The output of this invocation of the GCTR function is the ciphertext C.

In Blocks 1004 and 1005, the AAD and the ciphertext C are each appended with the minimum number of '0' bits, possibly none, so that the bit lengths of the resulting strings are multiples of the block size. The concatenation of these strings is appended with the 64-bit representations of the lengths of the AAD and the ciphertext C ([len (A)]$_{64}$, [len(C)]$_{64}$).

In Block 1006, the GHASH function is applied to the result to produce a single output block.

In Block 1007, this output block is encrypted using the GCTR function with the pre-counter block (J0) that was generated in Block 1002, and the result is truncated to the specified tag length t ($MSB_t$) to form the authentication tag T.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

A byte is a basic storage unit used in many integrated circuit logic and memory circuits, and consists of eight bits. Basic storage unit can have other sizes, including for example one bit, two bits, four bits, 16 bits and so on. Thus, the description of a encryption/decryption logic circuitry set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four bit storage units combined with eight bit storage units. As used herein, scrambled and encoded are substantially interchangeable and refer to using logic circuitry to apply PUF codes to electronic signals, as are descrambled and decoded, to perform the inverse operation(s). As used herein encrypted and enciphered are substantially interchangeable and refer to the use of circuitry and/or software to apply a cryptographic algorithm to data represented in electronic form (e.g., stored in a storage device or carried over a wire or airwave), as are decrypted and deciphered, to perform the inverse operation(s).

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the described technology, and it will be understood that numerous additional steps for accomplishing other functions can be performed before, after and between those shown.

A device having a security logic circuit, and a method responsive to a command sequence, are described herein.

A device having a security logic circuit and a PUF code generating circuit, and a method responsive to a command sequence, are described herein.

A device having a security logic circuit and a PUF code generating circuit, and a method for executing a command, are described, including receiving a command carrying an immediate data payload that comprises information that is to be encoded, encrypted or decoded, decrypted, applying PUF codes generated by the PUF code generating circuit to encode and decode electronic information being carried; thereby obtaining an encoded version or a decoded version of the electronic information; and executing a memory operation corresponding with the encoded version or the decoded version of the electronic information.

A device having a security logic circuit and a PUF code generating circuit and a method are described, including the security logic circuitry applies PUF code to at least one of a data path carrying an address, a data path carrying data for storage to or retrieved from a memory cells.

A device having a security logic circuit, a PUF code generating circuit, and a deterministic random number generator that produces a sequence of at least pseudo random numbers and a method are described, including the security logic circuitry that combines output of the deterministic random number generator with a personalization string to produce a seed value for initializing an encryption operation; and applies the PUF code generated as the personalization string.

A device having a security logic circuit and a PUF code generating circuit and a method are described, including the security logic circuitry applies an encryption algorithm to data to be stored in, stored in, retrieved from, or to be retrieved from memory cells based upon an additional authentication data (AD) as input; and wherein the security logic circuitry concatenates the PUF code generated to the counter value generated to obtain the additional authentication data.

A device having a security logic circuit and a PUF code generating circuit and a method are described, including the security logic circuitry to encode an address on the first path from the data register using the PUF code to produce an encoded address and to provide the encoded address to the address generator via the second path.

A device having a security logic circuit and a PUF code generating circuit and a method are described, including the security logic circuitry to encode data on the data path includes logic to encode input data on the first path from the data register using the PUF code to produce encoded input data and to provide the encoded input data to the SRAM buffer via the second path.

A device having a security logic circuit and a PUF code generating circuit and a method are described, including the security logic circuitry to encode output data on the first path from the sense amplifiers using the PUF code to produce encoded output data and to provide the encoded output data to the output buffers via the second path.

A device having a security logic circuit and a PUF code generating circuit and a method are described, including the security logic circuitry to an original key on the first path

16 from the first set of memory cells using the PUF code to produce an encoded key and to provide the encoded key to the second set of memory cells via the second path.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory device, comprising:
an array of memory cells;
a physically unclonable function (PUF) circuit to provide PUF codes;
a deterministic random bit generator (DRBG) to generate a sequence of at least pseudo random numbers; and
a data path directly connecting the array of memory cells and the DRBG, the data path including (i) a first path, having first and second endpoints, the first endpoint connecting a first circuit comprising a first set of memory cells at a first location in the array of memory cells, and the second endpoint connecting to the DRBG in the memory device, and (ii) a second path, having first and second endpoints, the first endpoint connecting the DRBG, and the second endpoint connecting to a second set of memory cells at a second location in the array of memory cells.

2. The memory device of claim 1, further comprising security logic circuitry to apply PUF code output, received from the first circuit via the first path to an input of the DRBG, and to apply pseudorandom number sequences generated by the DRBG as an output, to the second set of memory cells via the second path.

3. The memory device of claim 1, wherein pseudorandom number sequences generated by the DRBG are used for initializing encryption operations on data to be provided.

4. The memory device of claim 1, further including:
security logic circuitry to apply pseudorandom number sequences generated by the DRBG to the second set of memory cells via the second path, and
security logic circuitry to store a sequence of numbers generated by the DRBG as a key in the second set of memory cells in the array of memory cells.

5. The memory device of claim 1, further including security logic circuitry to apply PUF codes to initialize the DRBG.

6. The memory device of claim 5, wherein the security logic circuitry utilizes an output provided by the physically unclonable function (PUF) circuit to produce a seed value to initialize the DRBG.

7. The memory device of claim 5, wherein the security logic circuitry combines a PUF code with an output from a plurality of Cipher Block Chaining Message Authentication Code (CBC-MAC) circuits to produce a seed value to initialize the DRBG.

8. A memory device comprising:
an array of memory cells;
a physically unclonable function (PUF) circuit to provide PUF codes;
a Galois/Counter Mode (GCM) circuit to generate a ciphertext (C) based upon received input including: a plaintext (P), a key (K), and an initialization vector (IV) comprising a concatenation of a counter output from an integer counter with an additional authenticated data (AAD) including the PUF code, as received by the GCM circuit;

a first circuit connected to the GCM circuit and comprising a source of plaintext (P); and a second circuit connected to the GCM circuit and comprising an output target for ciphertext (C).

9. The memory device of claim 8, further including:

security logic circuitry to apply PUF code output, as retrieved from one of (i) the physically unclonable function (PUF) circuit and (ii) a third set of memory cells at a third location in the array of memory cells, and concatenated with a counter output from an integer counter, to the GCM circuit as additional authenticated data (AAD) for performing an encryption operation on a plaintext (P) data received from the first circuit using a key (K) and to provide, to the second circuit, an output of ciphertext (C) as encrypted.

10. The memory device of claim 8, wherein plaintext (P) is sourced from one or more sense amplifiers.

11. The memory device of claim 8, wherein plaintext (P) is sourced from a first set of memory cells at a first location in the array of memory cells.

12. The memory device of claim 8, wherein plaintext (P) is sourced from an SRAM buffer.

13. The memory device of claim 8, wherein ciphertext (C) is targeted to one or more output buffers.

14. The memory device of claim 8, wherein ciphertext (C) is targeted to a second set of memory cells at a second location in the array of memory cells.

15. The memory device of claim 8, wherein ciphertext (C) is targeted to an SRAM buffer.

16. A method for utilizing physically unclonable function (PUF) codes to initialize encryption keys in a memory device having (i) an array of memory cells, and (ii) a deterministic random bit generator (DRBG), interconnected by a data path, the method comprising:

applying via a first path, a PUF code to a deterministic random bit generator (DRBG), the first path having first and second endpoints, the first endpoint connecting a first circuit comprising a first set of memory cells at a first location in an array of memory cells, and the second endpoint connecting to the DRBG in the memory device, and applying via a second path, a pseudorandom number sequence generated by the DRBG to a second set of memory cells at a second location in the array of memory cells, the second path having first and second endpoints, the first endpoint connecting the DRBG, and the second endpoint connecting to the second set of memory cells at a second location in the array of memory cells.

17. The method of claim 16, wherein applying via a first path, a PUF code to a deterministic random bit generator (DRBG) further includes:

obtaining an initialization vector (IV) by concatenating a counter output from an integer counter with an additional authenticated data (AAD) including the PUF code; and applying the initialization vector (IV) to the DRBG.

18. The method of claim 17, further including incrementing the integer counter.

19. The method of claim 16, further including:

obtaining the PUF code; and storing the PUF code in the first set of memory cells of the array.

20. The method of claim 16, further including:

generating the PUF code using a physically unclonable function (PUF) circuit.

21. The method of claim 16, further including generating the PUF code using a physically unclonable function (PUF) circuit on the memory device.

\* \* \* \* \*